United States Patent [19]

Wanner et al.

[11] 4,284,148

[45] Aug. 18, 1981

[54] PORTABLE HAMMER DRILL WITH ROTATING TOOL

[75] Inventors: Karl Wanner, Echterdingen; Manfred Bleicher, Leinfelden, both of Fed. Rep. of Germany

[73] Assignee: Robert Bosch GmbH, Stuttgart, Fed. Rep. of Germany

[21] Appl. No.: 36,798

[22] Filed: May 7, 1979

[30] Foreign Application Priority Data

May 9, 1978 [DE] Fed. Rep. of Germany ....... 2820128

[51] Int. Cl.³ ...................... B23B 45/02; B25D 11/00; B25D 16/00; B25D 17/24

[52] U.S. Cl. ...................................................... 173/109

[58] Field of Search ...................... 173/109, 118, 139; 74/22 R

[56] References Cited

U.S. PATENT DOCUMENTS 3,741,317 6/1973 Unterschweigen et al. ........ 173/109
3,850,255 11/1974 Koehler ........................... 173/139 X
3,929,195 12/1975 Stiltz et al. ........................... 173/109

FOREIGN PATENT DOCUMENTS 2333584 1/1974 Fed. Rep. of Germany ........... 173/109
2326087 12/1974 Fed. Rep. of Germany ........... 173/109
2437023 2/1976 Fed. Rep. of Germany ........... 173/109
2506057 8/1976 Fed. Rep. of Germany ........... 173/109

*Primary Examiner*—Werner H. Schroeder
*Assistant Examiner*—Andrew M. Falik
*Attorney, Agent, or Firm*—Michael J. Striker

[57] ABSTRACT

A portable machine tool, especially a hammer drill, mainly comprises a housing in which a guide tube is arranged. A piston and a beater are guided in the guide tube reciprocatable in axial direction, the piston and the beater having facing axially spaced ends forming therebetween in the guide tube an air pillow through which the impact energy of the piston is transmitted to the beater. A turning sleeve coaxially surrounds the guide tube and is provided at its front end with a holding bushing formed with a coaxial bore therethrough in which a shaft of a tool, for instance a drill, is mounted for rotation therewith and for limited axial movement relative thereto. The beater is provided at the front end with a beater bolt having an outer diameter slightly smaller than the inner diameter of the bore so that the beater bolt, which transmits its impact energy directly to the free end of said tool shaft, may enter into the bore to be guided therein during reciprocation of the beater.

18 Claims, 2 Drawing Figures

PORTABLE HAMMER DRILL WITH ROTATING TOOL

BACKGROUND OF THE INVENTION

The present invention relates to a portable machine tool, especially a hammer drill, which comprises a preferably electric drive motor rotating over a gear transmission a turning sleeve and tool receiving means connected thereto in which a tool is guided, and which drives further a striking mechanism which includes an axially reciprocatable drive piston, a coaxial beater driven, preferably over an air pillow, from the drive piston, and in which the beater transmits its striking energy onto the tool.

Such a portable machine tool is, for instance, known from the DE-OS No. 24 49 191. In this known construction the drive motor drives a pinion on the motor shaft and a gear meshing therewith drives a wobble plate which forms part of the striking mechanism. The wobble plate is mounted on a counter shaft for rotation therewith, which carries a further pinion meshing with a gear connected to the turning sleeve. The turning sleeve itself is likewise provided with a gearing which meshes with the gearing of a boring spindle of the tool receiver for rotating the latter.

Such a construction in which the striking energy from the beater is transmitted to the tool through intermediate members, such as the boring spindle, results in a relatively large construction length of the machine tool and therewith connected increased cost. Such intermediate members will also increase the total weight of the machine tool. An additional essential disadvantage is further that, due to the great mass of such intermediate members, the efficiency of the transmission of the striking energy of the tool is greatly reduced.

SUMMARY OF THE INVENTION

It is an object of the present invention to provide a portable machine tool, especially a hammer drill, which is essentially shorter and lighter than such machine tools known in the art.

It is a further object of the present invention to provide a portable machine tool of the aforementioned kind which is composed of relatively few and simple parts so that it can be manufactured at considerably lesser cost than such portable machine tools known in the art.

It is an additional object of the present invention to provide a portable machine tool of the aforementioned kind in which the efficiency of the transmission of the striking energy onto the tool is considerably increased.

These objects of the present invention are obtained in that the tool receiving means are provided by a holding bushing arranged coaxially and directly connected, preferably integral with the turning sleeve for rotation therewith, in which the holding bushing is provided with a coaxial bore aligned with and open towards the beater. The tool shaft of the tool is received for rotation with the bushing and for limited axial movement relative thereto and projecting with a rear end thereof toward the beater so that the striking energy of the latter may be directly transmitted to the tool shaft.

By forming the turning sleeve and the holding bushing from a single part and by arranging the tool shaft directly in the bore of the holding bushing so that the beater without any intermediate members transmits its striking energy directly to the free end of the tool shaft, the following advantages are obtained. The machine tool can be constructed in a compact manner and be manufactured at a small cost. The construction of the machine tool is simplified and its weight reduced, so that the operation of the machine tool is essentially improved. In addition the efficiency of the striking energy transmission through the direct impact of the beater onto the tool is considerably increased.

According to a further feature of the present invention, the beater is provided at the end thereof facing the tool shaft with a coaxially beater bolt having a planar end face adapted to directly engage a corresponding end face on the facing end of the shaft. The diameter of the beater bolt is preferably slightly smaller than that of the bore through the holding bushing so that the beater bolt during its impact on the shaft end may move into the bore to be guided therein. This leads to a further reduction of the overall length of the machine tool.

The outer diameter of the holding bushing is preferably smaller than the outer diameter of the turning sleeve and the arrangement preferably includes also a catching device in the region of the stepped transition from the turning sleeve to the holding bushing for catching the beater in a position in which the beater bolt extends into the bore. This catching device preferably comprises an elastically deformable ring, such as an O-ring, and the beater is preferably provided axially spaced from the aforementioned planar end face of the beater bolt with a radially projecting annular shoulder having a diameter greater than the inner diameter of the deformable ring in undeformed condition and the beater bolt is provided to opposite sides of the annular shoulder with axially extending radially decreasing portions. This provides a catching device of simple construction for the beater in its extended idling position.

The holding bushing is provided with means for rotating the shaft together with the bushing and for limiting the axial movement of the shaft relative to the holding bushing. The means for rotating the shaft together with the bushing preferably comprise a pair of diametrically opposite, axially extending teeth, preferably provided on the tool shaft, and a pair of diametrically opposite axially extending grooves, having open ends facing the beater, in which the aforementioned teeth are engaged. The means for limiting axial movement of the shaft relative to the holding bushing preferably comprise a pair of balls respectively located in diametrically opposite radial bores of the holding bushing and a second pair of opposite axially extending grooves of predetermined length provided in the shaft and having at the ends thereof abutment faces, and the balls normally extend with portions thereof into the grooves. The arrangement preferably includes also a locking bushing closely surrounding the holding bushing and axially and circumferentially movable with respect to the latter between a first position retaining the portions of the balls in the aforementioned grooves and a second position permitting the portions of the balls to move out of the second grooves, so that the tool shaft may be withdrawn from the bore of the holding bushing.

The arrangement includes preferably further a guide tube fixedly arranged in the housing in which the piston and beater are guided for movement in axial direction. The piston and the beater preferably have ends facing each other and being spaced in axial direction from each other to define between the facing ends in the guide tube an air pillow through which the striking energy produced by the piston during reciprocation thereof is transmitted to the beater.

The turning sleeve surrounds the guide tube radially spaced therefrom and the transmission between the drive means and the turning sleeve for rotating the latter preferably comprises a gear connected to that end of the turning sleeve which faces away from the holding bushing. An antifriction bearing turnably supports said turning sleeve at the region of the gear on the guide tube, while an O-ring surrounding the guide tube at the end of the antifriction bearing facing away from the gear is provided for cushioning the bearing in axial direction. An annular disk surrounding the guide tube may be further arranged between the O-ring and the bearing. Due to this arrangement the axial force occurring during operation of the machine tool is not directly transmitted to the housing of the latter, but intersepted by the damping ring and dampened. The portable machine tool is thus easier to handle and to guide.

According to a further advantageous feature of the present invention an additional damping device is provided in the axial region of the turning sleeve between the aforementioned gear and the holding bushing. This damping device becomes active during pulling out of a tool, especially a drill which during operation becomes locked in the material in which it operates.

The construction preferably includes also a safety coupling arranged ahead or behind the gear which drives the turning sleeve.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
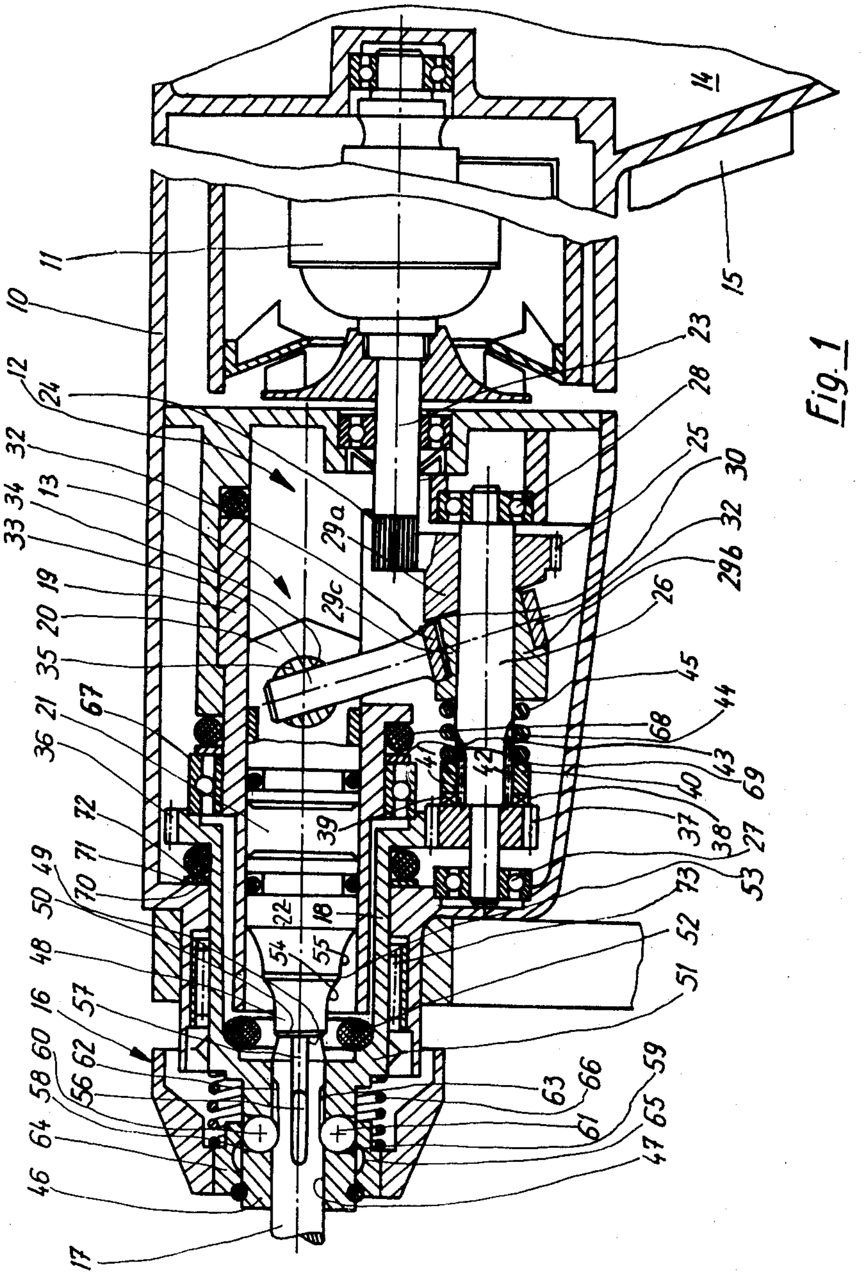
FIG. 1 is a schematic axial cross-section of a first embodiment of a hammer drill according to the present invention.

Referring now to the drawing, and more specifically to FIG. 1 of the same, it will be seen that the hammer drill according to the present invention comprises a housing 10 in which electric drive motor 11, a transmission 12 and a striking mechanism 13 is mounted which will be described later on in further detail.

A handle 14, only partially shown in FIG. 1, is provided at the rear end of the housing 10 and the handle 14 is provided with a pusher member 15 for operating a switch, not shown in the drawing, by means of which the drive motor 11 may be actuated. At the front end of the housing opposite the handle 14 is a tool receiving means 16 arranged, which will be described later on in further detail. The tool receiving means 16 serves to receive a tool 17 partially shown in FIG. 1, for instance a drill or a chisel.

The tool receiving means 16 is rotatable by means of a turning sleeve 18 and the transmission 12 located in the interior of the housing. The striking mechanism 13 is likewise driven from the transmission 12. The striking mechanism comprises an axially reciprocable, non-rotatable drive piston 20 which drives over an air pillow 21 a beater 22. The beater 22 transmits its beating energy directly onto the tool 17. The drive piston 20 and the beater 22 are coaxially arranged behind each other in a guide tube 19 in which these two elements are closely guided. The guide tube 19 is non-turnably mounted in the housing 10.

The drive motor 11 carries, fixedly connected to its drive shaft 23, a pinion 24 which meshes with a gear 25 on a counter shaft 26 mounted on roller bearings 27 and 28 in the housing 10 and extending parallel to the drive shaft 23. A gear 25 is fixedly connected or integral with a drum half *29a* which is mounted on the counter shaft 26 for rotation therewith. The counter shaft 26 carries further a second drum half *29b* fixedly connected thereto for rotation therewith and provided with an annular portion *29c* extending inclined to the axis of the counter shaft 26. The two drum halves *29a* and *29b* have faces directed towards each other which are inclined at right angles to the axis of the ring member *29c* and form between themselves an annular groove 30 in which a ring 32 is turnably arranged. An entrainment bolt 33 projects substantially normal to the axis of the ring 32 from the latter and engages with its end opposite from the ring 32 with slight clearance into a cross-bore 34 provided in a turning bolt 35. The turning bolt 35 is turnably arranged in corresponding bores of the fork-shaped end of the drive piston 20, which is opposite the end of the latter facing the beater 22.

The turning sleeve 18 carries a gear 36 connected thereto for rotation therewith and preferably integrally formed with the turning sleeve 18. The gear 36 meshes with a pinion 37 freely turnable, but axially immovably, arranged on the counter shaft 26. The pinion 37 forms part of a safety coupling. For this purpose the pinion 37 is provided at its right end face, as viewed in FIG. 1, with axially extending tooth-shaped coupling claws 38, which are engaged with axially extending likewise tooth-shaped coupling claws 39 on a coupling ring 40 arranged adjacent to the pinion 37 on the counter shaft 26. The coupling ring 40 is non-rotatable, but axially movably mounted on the counter shaft 26. The coupling ring 40 is provided with two diametrically arranged teeth 41 and 42 projecting radially inwardly from the inner peripheral surface of the ring and engaged into longitudinal grooves 43, respectively 44, provided in the counter shaft 26 so that the ring 40 will rotate with the counter shaft 26 while movable in axial direction with respect thereto. A coil compression spring 45 arranged about the counter shaft 26 and abutting with opposite ends respectively against the coupling ring 40 and the drum half *29b* presses the coupling ring 40 in axial direction towards the left, as viewed in FIG. 1, to normally maintain the coupling claws 38 and 39 in engagement with each other, so that the pinion 37 is rotated during rotation of the counter shaft 26. The tool receiving means 16 comprises a cylindrical holding bushing 46 with an axial receiving bore 47 extending therethrough. The holding bushing 46 is formed integral with the turning sleeve 18 and coaxial therewith. The bore 47 has a diameter substantially equal to the outer diameter of the shaft of the tool 17 and serves to receive and guide the tool 17 with its shaft. The bore 47 is open towards and coaxial with the beater 22 and the free end of the shaft projects in the position shown in FIG. 1 rearwardly beyond the holding bushing 46 to be directly impinged by the beater 22.

The beater 22 carries at its end facing the holding bushing 46 a coaxial beater bolt 48 integrally connected thereto with a planar end face 49. This end face 49 impinges directly onto the end face 50 at the free end of the shaft of the tool 17. The diameter of the beater bolt 48 is slightly smaller than the inner diameter of the bore 47 in the holding bushing 46. The beater bolt 48 can, therefore, during its impact on the tool 17, enter into a bore 47 to be guided therein.

The outer diameter of the holding bushing 46 is smaller than the outer diameter of the turning sleeve 18. In the region of the transition of the holding bushing 46 to the turning sleeve 18 there is a radial step 51 provided. A catching device for the beater 22 in its non-illustrated extended end position is arranged in the interior of the radial step 51. This catching device comprises an O-ring 52, which, for instance, is held between the end of the guide tube 19 and an inner shoulder of the radial step 51 of the turning sleeve 18. The beater 22 is provided, axially spaced from the planar end face 49 thereof, with a radially projecting annular shoulder 53 and at opposite sides of the latter with axially extending radially decreasing shoulder portions 54 and 55. The diameter of the annular shoulder 53 is slightly greater than the inner diameter of the O-ring 52 in undeformed condition. If the tool 17 is moved to the extreme left position, the annular shoulder 53 will pass through the O-ring 52 and thereby arrest the beater and the tool during idling of the portable machine tool.

The holding bushing 46 and the shaft of the tool 17 are provided with cooperating means for turning the tool 17 during rotation of the holding bushing 46 and for limiting the axial movement of the tool shaft in the holding bushing.

In order to turn the shaft of the tool 17 during rotation of the holding bushing 46, the latter is provided with two diametrically opposite teeth projecting inwardly from the holding bushing, of which only one tooth 56 is shown in the drawing, and each of these teeth engages into axially extending grooves 57 provided in the shaft of the tool 17, which grooves 57 are open toward the beater bolt 48. The teeth 56 are arranged substantially midway of the holding bushing 46 and therefore do not prevent entering of the beater bolt 48 into the bore 47 of the holding bushing 46.

The means for limiting the axial movement of the shaft of the tool 17 in the bore 47 of the holding bushing 46 comprise two diametrically opposite radial bores 58 and 59 in the holding bushing 46 in which radially movable balls 60 and 61 are respectively arranged, which engage with portions thereof into longitudinally extending grooves 62 and 63 provided in the shaft of the tool 17. The longitudinal grooves 62 and 63 have at opposite ends curved abutment faces. This arrangement will assure that the tool 17, depending on the length of the grooves 62 and 63 and the position of the balls 60 and 61 engaged therein, has an axial movement of 6 to 15 millimeters, which the striking mechanism needs for its transition to the idle run. A locking bushing 64 surrounds the holding bushing 46 by means of which portions of the balls 60 and 61 are held in the longitudinal grooves 62 and 63, respectively. The locking bushing 46 is provided at the inner surface thereof with an annular groove 65 into which portions of the balls 60 and 61 may engage during movement of the locking bushing 64 towards the right, as viewed in FIG. 1, so that the balls 60 and 61 may move out of the longitudinal grooves 62 and 63 and the tool 17 may be withdrawn from the bore 47 in the holding bushing 46. A coil compression spring 66 acting on the locking bushing 64 normally holds the latter in the position shown in FIG. 1, in which the tool 17 can only perform a limited axial movement with respect to the holding bushing 46.

The integral unit formed by the holding bushing 46 and the turning sleeve 18 is mounted in the region of the gear 36 by means of a ball bearing 67 on the guide tube 19. The ball bearing 67 is at the side thereof facing away from the holding bushing 46 axially resiliently supported by an O-ring 68. The O-ring 68 surrounds the guide tube 19 and is axially supported on an annular collar of the latter or on the housing 10. An annular disk 69 is provided between the O-ring 68 and the ball bearing 67. The axial force which during operation of the tool 17 is transmitted by the balls 60 and 61 onto the holding bushing 46, the turning sleeve 18 and the gear 36 is, therefore, transmitted over the ball bearing 67, the disk 69 and the elastically deformable O-ring 68 onto the guide tube 19 and therewith to the housing 10. A damping of the striking force is thus obtained and the hammer drill will be easier to handle.

The turning sleeve 18 is further supported in the axial region between the gear 36 and the holding bushing 46 toward the left, as viewed in FIG. 1, by means of a further damping device on the housing 10. This damping device will act during pulling out of the tool 17, formed by a drill, when the latter is stuck in the rock in which the drill is engaged during operation. This second damping device comprises an elastically deformable O-ring 70 provided on the side of the gear 36 facing away from the ball bearing 67 and the O-ring 70 abuts over an annular disk 71 onto a shoulder 72 of the housing 10. The O-rings 70 and the annular disk 71 are mounted on the turning sleeve 18. The right side of the O-ring 70, as viewed in FIG. 1, abuts against an axially extending annular surface of the gear 36. If the hammer drill with the tool 17 is withdrawn from the rock in which it operates, the thereby acting axial force is transmitted over the annular surface of the gear 36, the elastically deformable O-ring 70 and the disk 71 onto the shoulder 72 of the housing and thereby resiliently intercepted, so that also in this direction a damping is obtained.

The integral unit formed by the holding bushing 46 and the turning sleeve 18 is supported in the axial region of the beater 22 and adjacent the radial step 51 by means of a needle bearing 73 on the housing 10.

When the drive motor 11 is energized, it will drive the counter shaft 26 via the output shaft 23, with the pinion 24 thereon meshing with the gear 25. A compression spring 45 presses the coupling ring 40 in axial direction towards the left, as viewed in FIG. 1, so that the coupling claws 39 thereon will engage with the coupling claws 38 on the pinion 37. The coupling ring 40, which is connected by the teeth 41 and 42 engaging into the grooves 43 and 44 with the counter shaft 26 for rotation therewith, in turn rotates the pinion 37. The pinion 37 meshes with the gear 36 integrally formed with the turning sleeve 18 and the holding bushing 46 and rotates therefore these elements and the tool 17. During rotation of the counter shaft 26, the ring 32 will wobble in the ring groove 30, so that the entrainment bolt 33 will reciprocate the drive piston 20 in the guide tube 19 in axial direction of the latter. During movement of the drive piston 20 towards the left, as viewed in FIG. 1, this movement is transmitted over the air pillow 21 to the beater 22, which in turn will beat with the end face 49 of the beater bolt 48 against the opposite end face 50 on the shaft end of the tool 17. The tool 17 is, therefore, forceably moved from the position shown in FIG. 1 towards the left for a distance until the balls 60 and 61 in the longitudinal grooves 62 and 63 stop this axial movement of the tool 17 by abutting against the right end faces of the grooves 62 and 63. During operation of the hammer drill in which the tool 17 is pressed against a wall, the tool 17 will perform a rotary and axial movement. Each time when the annular shoulder 53 on the beater 22 passes in axial direction beyond the O-ring 52, which is thereby slightly deformed in radial direction, the O-ring 52 will tend to engage in the rear shoulder 55 to thereby hold the beater in the pushed-out idle position. When now the machine tool is pressed against a wall the axial pressure acting thereby on the tool 17 will be transmitted to the beater and the latter released from its arrested position and be moved back to the position as shown in FIG. 1, whereafter the beater 22 will be again driven over the air pillow 21 towards the left, as viewed in FIG. 1, to again apply an impact in axial direction on the tool shaft. Should the tool be seized in the material in which it is engaged, then the safety coupling will trip. Thereby the coupling ring 40 will be moved against the action of the compression spring 45 towards the right, as viewed in FIG. 1, so that its coupling claws 39 will become disengaged from the coupling claws 38. The counter shaft 26 will continue to rotate without, however, rotating the turning sleeve 18 and the holding bushing 46 and the tool connected thereto. The striking mechanism, however, will remain in operation.

The axial forces, which during operation of the hammer drill and pressing of the tool 17 against a wall, are transmitted from the tool 17 over the balls 60 and 61 to the holding bushing 46, the turning sleeves 18, the gears 36, bearing 67, the annular disk 69 and the O-ring 68 onto the guide tube 19 or another part of the housing 10. The O-ring 68 is thereby elastically deformed. This will result in an impact damping during the operation of the hammer drill, which will make it easier for the operator to handle the latter.

If the tool 17, for instance a drill, is to be pulled out from the material in which it is engaged, then an axial pulling force directed towards the left, as viewed in FIG. 1, will be imparted to the hammer drill over the balls 60, 61 to the holding bushing 46 and the turning sleeve 18 and the gear 36 integrally formed therewith. This axial force will be dampened in that the gear 36 will abut with its annular face onto the O-ring 70, with the latter in turn abutting against the housing shoulder 72. A damping in this axial direction will thus also be obtained.

The direct holding of the tool 17 in the holding bushing 46 and the integral construction of the holding bushing 46 with the turning sleeve 18 and the gear 36, results in an extremely short and light construction of the hammer drill. The hammer drill is composed of relatively few parts and can, therefore, be manufactured at very reasonable cost. In addition, the efficiency of the impact transmission is considerably increased due to the direct impact of the beater 22 onto the end face 50 of the tool 17. Any additional transmitting members for transmitting the impact energy from the beater 22 onto the tool 17 are avoided with the construction of the present invention, which will result in the above-mentioned increased efficiency of the hammer drill.

Figure 2:
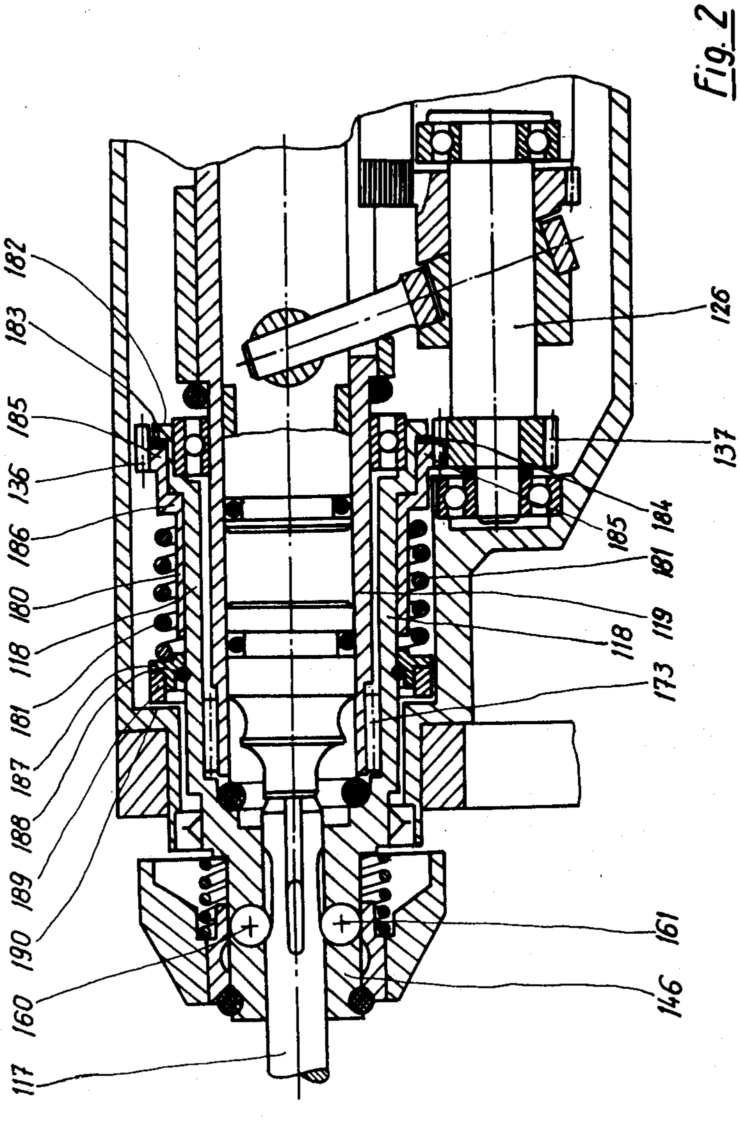
FIG. 2 is a schematic axial cross-section partially illustrating a second embodiment of a hammer drill according to the present invention.

In the second embodiment according to the present invention, illustrated in FIG. 2, elements corresponding to the elements of FIG. 1 are designated with corresponding reference numerals increased by 100 so that these elements need not further be described.

The second embodiment differs from the above-described first embodiment by a different construction of the safety coupling and by another construction relating to the damping of the axial forces which occur during retraction of the hammer drill with its tool.

In the second embodiment, the pinion 137 is fixedly connected to the counter shaft 126 for rotation therewith. The gear 136, however, is mounted on a special coupling sleeve 180. The coupling sleeve 180 concentrically surrounds the turning sleeve 118 and is rotatable relative to the latter and axially movable with respect thereto against the action of an axially extending coupling spring 181. The gear 136 meshes with the pinion 137 so that during rotation of the countershaft 126 the coupling sleeve 180 is rotated. The turning sleeve 118 itself is not provided with a gear. The turning sleeve 118 fixedly carries at its right end, as viewed in FIG. 2, a collar 182 which is provided at the side thereof facing the holding bushing 146 with axially extending tooth-shaped coupling claws 183. The coupling claws 183 are engaged with axially extending tooth-shaped coupling claws 184 coordinated therewith, which are provided on an axially adjacent shoulder 185 of the coupling sleeve 180. A coupling spring 181 abuts with its right end, as viewed in FIG. 2, onto a collar 186 of the coupling sleeve 180. The other end of the coupling spring 181 abuts against a supporting ring 187, which is mounted on the turning sleeve 118 and which forms part of a damping device to be described later on. The supporting ring 187 is mounted axially movable on the turning sleeve 118 towards the right, as viewed in FIG. 2. Movement of the supporting ring 187 in axial direction towards the left, as viewed in FIG. 2, beyond the position as shown in this Figure is prevented by a circlip 188, arranged in a groove of the turning sleeve 118. As shown, the supporting ring abuts against the circlip 181 so that a further axial movement towards the left beyond the circlip 182 is prevented and so that the supporting ring 187 can be moved only against the action of the coupling spring 181. The supporting ring 187 carries on the side thereof facing the holding bushing 146 a slide ring 189 which during normal operation is spaced from a shoulder 19 of the housing. During operation of the hammer drill and the tool 117 inserted therein, when the tool 117 is withdrawn from the material in which it is engaged, the axial pulling force acting on the tool 117 is transmitted over the balls 160, 161 onto the holding bushing 146 and the turning sleeve 118 integral therewith and from there over the collar 182, the engaged coupling claws 183, 184 and over the shoulder 186 transmitted to the coupling spring 181. Thereby the supporting ring 187 with its slide ring 189 will abut against the shoulder 190 of the housing, whereby the coupling spring 181 will act as damping spring to dampen the axial force. Thereby the circlip 188 will be at least for a short time relieved of pressure because it will be moved together with the turning sleeve 118 relative to the supporting ring 187 towards the left, as viewed in FIG. 2.

The turning sleeve 118 is supported by means of a needle bearing 173 on the outer surface of the guide tube 119. All other elements of the embodiment shown in FIG. 2 correspond go the elements as described above in connection with the embodiment shown in FIG. 1.

During operation of the second embodiment and rotation of the counter shaft 126, the pinion 137 mounted thereon for rotation therewith will be likewise rotated. The pinion 137 meshes with the gear 136 which is connected to the coupling sleeve 180 for rotation therewith. The coupling sleeve 180 will thus also be rotated. When the coupling claws 183 and 184 are engaged with each other, then the turning sleeve 118 and the holding bushing 146 integral therewith will also be rotated during rotation of the coupling sleeve 180. When the safety coupling trips, then the coupling claws 184 on the coupling sleeve 180 will be disengaged from the coupling claws 183 on the collar 182 of the turning sleeve 118 so that rotation of the latter will stop. The coupling sleeve 180 is thereby moved in axial direction towards the left, as viewed in FIG. 2, against the action of the coupling spring 181. The gear 136 on the coupling sleeve remains in mesh with the pinion 137 and turns now on the turning sleeve 118 relative to the latter. The rotary drive for the tool 117 is thereby disconnected, whereas the striking device remains in operation.

It will be understood that each of the elements described above, or two or more together, may also find a useful application in other types of portable machine tools differing from the types described above.

While the invention has been illustrated and described as embodied in a portable machine tool, especially a hammer drill, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A portable machine tool, such as a hammer drill, comprising housing means; a piston guided in said housing means for reciprocation in axial direction; a beater coaxial with said piston to be reciprocated by said piston during reciprocation of the latter; tool receiving means comprising a turning sleeve surrounding said beater and a holding bushing extending beyond said beater and fixedly connected to said turning sleeve for movement therewith, said holding bushing being formed with an axial bore therethrough having an open end facing said beater; a tool having a shaft extending through said bore towards said beater and having a free end for directly receiving the impact energy provided by the beater during reciprocation thereof, said tool shaft being guided in said bore for limited reciprocation in axial direction and held therein for rotation with said holding bushing; drive means in said housing means; first transmission means between said drive means and said piston for reciprocating the latter; second transmission means between said drive means and said turning sleeve for rotating said turning sleeve; first cooperating means on said shaft and said holding bushing for rotating said shaft together with said bushing, said first cooperating means comprising a pair of diametrically opposite axially extending teeth elements respectively engaging in a pair of diametrically opposite groove elements having open ends facing said beater, one of said pair of elements being provided on said shaft and the other on said holding bushing; and second cooperating means for limiting axial movement of said shaft relative to said holding bushing.

2. A portable machine tool as defined in claim 1, wherein said second cooperating means comprise a pair of balls respectively located in diametrically opposite axial bores in said holding bushing and a second pair of diametrically opposite axially extending grooves of predetermined length having at the ends thereof abutment faces provided in said shaft, said balls normally project with portions thereof into said second grooves.

3. A portable machine tool as defined in claim 2, and including a locking bushing closely surrounding said holding bushing and axially and circumferentially movable with respect to the latter between a first position retaining said portions of said balls in said second grooves and a second position permitting said portions of the balls to move out of said second grooves so that said tool shaft may be withdrawn from said bore of said holding bushing.

4. A portable machine tool, such as a hammer drill, comprising housing means; a piston guided in said housing means for reciprocation in axial direction; a beater coaxial with said piston to be reciprocated by said piston during reciprocation of the latter, said housing means including a guide tube in which said piston and beater are guided for movement in axial direction, said piston and said beater having ends facing each other and being spaced in axial direction from each other, said facing ends defining in said guide tube an air pillow through which the striking energy produced by said piston during reciprocation thereof is transmitted to said beater; tool receiving means comprising a turning sleeve surrounding said beater and a holding bushing extending beyond said beater and fixedly connected to said turning sleeve for movement therewith, said turning sleeve surrounding said guide tube radially spaced therefrom, said holding bushing being formed with an axial bore therethrough having an open end facing said beater; a tool having a shaft extending through said bore towards said beater and having a free end for directly receiving the impact energy provided by the beater during reciprocation thereof, said tool shaft being guided in said bore for limited reciprocation in axial direction and held therein for rotation with said holding bushing; drive means in said housing means; first transmission means between said drive means and said piston for reciprocating the latter; and second transmission means between said drive means and said turning sleeve for rotating said turning sleeve, said second transmission means comprising a gear connected to that end of said turning sleeve which faces away from said holding bushing, and including an anti-friction bearing turnably supporting said turning sleeve at the region of said gear on said guide tube, and an O-ring surrounding said guide tube at that end of said anti-friction bearing which faces away from said gear for cushioning said bearing in axial direction.

5. A portable machine tool as defined in claim 4, and including an annular disk surrounding said guide tube between said O-ring and said bearing.

6. A portable machine tool as defined in claim 4, and including a damping device in the axial region of said turning sleeve between said gear and said holding bushing, said damping device becoming active when the tool during operation becomes seized in a bore formed thereby in the material operated on and has to be withdrawn from the material.

7. A portable machine tool as defined in claim 6, wherein said damping device comprises an elastically deformable ring between a shoulder of said housing and a shoulder on said turning sleeve.

8. A portable machine tool as defined in claim 7, and including an annular disk sandwiched between said shoulder of said housing and said deformable ring, said shoulder on said turning sleeve being constituted by an annular face of said gear fixedly connected to said end of said turning sleeve.

9. A portable machine tool as defined in claim 8, wherein said elastically deformable ring and said annular disk are mounted on said turning sleeve.

10. A portable machine tool as defined in claim 4, wherein said second transmission means includes a safety coupling located ahead of said gear.

11. A portable machine tool as defined in claim 10, wherein said gear is fixedly connected to said turning sleeve, wherein said drive means has an output shaft and wherein said second transmission means comprises a counter shaft rotatably mounted in said housing, a gear transmission between said output shaft and said counter shaft, a pinion freely turnable but axially immovably mounted on said counter shaft and meshing with said gear, said pinion forming part of said safety coupling and being provided with axially extending tooth-shaped coupling claws, said safety coupling further including a coupling ring mounted on said counter shaft for rotation therewith and movable in axial direction toward and away from said pinion and provided with axially extending tooth-shaped coupling claws adapted to interengage with the coupling claws on said pinion, and biasing means biasing said coupling ring towards said pinion to releasably hold said coupling claws on the latter interengaged with those on said coupling ring.

12. A portable machine tool as defined in claim 4, wherein said second transmission means includes a safety coupling located between said gear and said turning sleeve.

13. A portable machine tool as defined in claim 12, wherein said drive means has an output shaft and wherein said second transmission means comprises a counter shaft rotatably mounted in said housing, a gear transmission between said output shaft and said counter shaft, a pinion fixedly connected to said counter shaft for rotation therewith and meshing with said gear, a coupling sleeve mounted on said turning sleeve rotatable and axially movable relative to the latter, said turning sleeve being provided on the side of a radially projecting shoulder thereon facing said holding bushing with axially projecting tooth-shaped coupling claws, said coupling sleeve being provided on a radially projecting shoulder with axially projecting tooth-shaped coupling claws adapted to interengage with said coupling claws on said turning sleeve, and biasing means for biasing said coupling sleeve in a direction to releasably hold the coupling claws on said coupling sleeve interengaged with those of said turning sleeve.

14. A portable machine tool as defined in claim 13, and including a damping device in the axial region of said turning sleeve between said gear and said holding bushing, and including a supporting ring forming part of said damping device, said biasing means being constituted by a coil compression spring abutting with one end against the shoulder on said coupling sleeve adjacent said gear and with the other end against said supporting ring.

15. A portable machine tool as defined in claim 14, wherein said supporting ring is axially movably mounted on said turning sleeve, and including an elastically deformable ring carried by said supporting ring on the side of the latter facing said holding bushing.

16. A portable machine tool as defined in claim 14, wherein said supporting ring is axially movably mounted on said turning sleeve and including a circlip on said turning sleeve against which said supporting ring abuts under the action of said spring, and a slide ring carried by said supporting ring on the side of the latter directed towards said holding bushing, said slide ring being normally axially spaced from a radial shoulder provided on said housing means, but abutting thereagainst during withdrawal of the tool from the material it is engaged in and concomitant shifting of the turning sleeve relative to said housing while said spring is compressed.

17. A portable machine tool, such as a hammer drill, comprising housing means; a piston guided in said housing means for reciprocation in axial direction; a beater coaxial with said piston to be reciprocated by said piston during reciprocation of the latter; tool receiving means comprising a turning sleeve surrounding said beater and fixedly connected to said turning sleeve for movement therewith, said holding bushing being formed with an axial bore therethrough having an open end facing said beater, the outer diameter of the holding bushing being smaller than the outer diameter of said turning sleeve and a region of stepped transition being formed from said turning sleeve to said holding bushing; a tool having a shaft extending through said bore towards said beater and having a free end for directly receiving the impact energy provided by the beater during reciprocation thereof, said tool shaft being guided in said bore for limited reciprocation in axial direction and held therein for rotation with said holding bushing, said beater being provided at the end thereof facing said tool shaft with a coaxial beater bolt having a planar end face adapted to directly engage a corresponding end face on the free end of said shaft, the diameter of said beater bolt being slightly smaller than that of said bore through said holding bushing so that the beater bolt during its impact on said shaft end may move into said bore to be guided therein; catching means in said region of stepped transition from said turning sleeve to said holding bushing for catching the beater in its idle position in which the beater bolt extends into said bore; drive means in said housing means; first transmission means between said drive means and said piston for reciprocating the latter; and second transmission means between said drive means and said turning sleeve for rotating said turning sleeve.

18. A portable machine tool as defined in claim 17, wherein said catching means comprise an elastically deformable ring and wherein said beater is provided axially spaced from said planar end face of said beater bolt with a radially projecting annular shoulder and at opposite sides of the latter with axially extending radially decreasing shoulder portions, said annular shoulder having a diameter greater than the inner diameter of said elastically deformable ring in the undeformed condition of the latter.

* * * * *